Patented Aug. 30, 1927.

1,640,724

UNITED STATES PATENT OFFICE.

JOHN H. SACHS, OF WILMINGTON, DELAWARE, ASSIGNOR TO E. I. DU PONT DE NEMOURS & COMPANY, OF WILMINGTON. DELAWARE, A CORPORATION OF DELAWARE.

N-DIHYDRO-DIANTHRAQUINONE-AZINE COMPOUNDS AND PROCESS OF MAKING SAME.

No Drawing.   Application filed January 23, 1925.  Serial No. 4,164.

This invention relates to a new form of N-dihydro-dianthraquinone-azine of an appreciably higher degree of purity than has heretofore ordinarily been obtained; and the invention also relates to a process of making the new product above described, which process, briefly stated, comprises suspending the leuco derivative of N-dihydro-dianthraquinone-azine in water, and heating the suspension to about the boiling point in the presence of oxygen or air, the use of caustic soda in the manner and amount heretofore customary, being avoided.

The higher purity manifests itself in several respects. When simply mixed and used as a pigment, the new product gives shades that are greener and brighter than those obtained by the ordinary oxidation of the leuco derivative (N-dihydro-anthraquinone-anthrahydroquinone-azine.) The probable graphical formula of N-dihydro-dianthraquinone-azine is as follows:

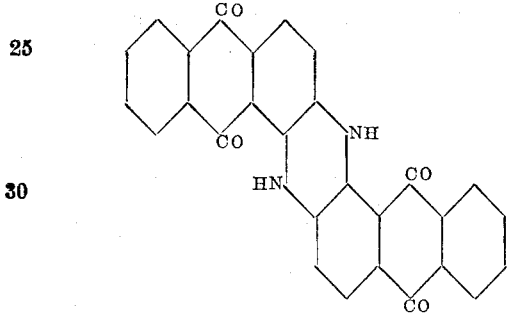

When rendered soluble by reduction with caustic soda and sodium hydrosulfite, that is, when vatted, the new product dyes textile fibres in shades that are redder and brighter and at the same time more resistant to bleaching agents than that obtained from an N-dihydro-dianthraquinone-azine made by any process other than one involving crystallization of the azine from inert solvents.

The ordinary method for the oxidation of leuco N-dihydro-dianthraquinone-azine consists in boiling or blowing with air a solution of the leuco compound in water to which has been added sufficient caustic soda to render the color soluble. When oxidized in this manner the oxidized product separates in blue flocks having no definite crystalline form. Complete oxidation by this method is difficult to obtain because of the fact that the leuco compound can be gotten completely into solution only by the use of very large volumes of dilute caustic soda solutions and even then only with difficulty.

The new product, obtained by the slow oxidation of leuco N-dihydro-dianthraquinone-azine in a relatively concentrated water suspension, is characterized by its intense coppery lustre and by its definite crystalline form. Following is a specific example as to how it may be obtained.

Ten parts of leuco N-dihydro-dianthraquinone-azine in the form of a paste containing from 20 to 25% of solids and as obtained according to Example II of my co-pending application, Serial No. 733,840 are added quickly to 60-80 parts of water which has previously been heated to 90° C. The suspension is brought to the boil either with or without the introduction of air, and the boiling continued until the blunt needle-shaped crystals of the leuco compound have changed completely into the long very fine hair-like crystals of the oxidized color. These crystals have an approximate length on the order of 1/100 of an inch, and the thickness of the crystals is on the order of about 1/100 to 1/1000 of the length. During the boiling, the color of the suspension gradually changes from a dull blue to a bright coppery blue. The suspension also becomes thicker until at the end it has almost the consistency of a paste. The mass is then filtered and the product washed with water until all soluble materials are removed.

In order to use this material as a pigment, the press cake, as obtained above containing from 20-25% of dry color, is stirred for a short time (one to ten hours) in a mixer or any vessel provided with a stout agitator. The stirring results in the breaking up of the fine hair-like crystals of the oxidized color into very short lengths. It can then be used directly as a pigment, and it yields shades that are much greener and brighter than those obtained ordinarily, or from the product that comes into the market under the name of Indanthrene Blue RS paste or powder. It can also be used directly for the dyeing of textile fibres and it yields shades that are redder and much brighter than those obtained from any other N-dihydrodianthraquinone-azine excepting that which has been crystallized from an inert solvent.

My invention is not, of course, limited to the specific example given above, since the process may be modified by adding to the water, in which the leuco derivative is, or is to be, suspended caustic soda or other reagent, but in substantially less amount than it has heretofore been customary to use. In general, no special advantages are gained by such additions, and the addition of caustic soda in the amount heretofore used will cause a substantial change in the character of the oxidized azine compound.

I claim:

1. The process of producing an N-dihydro-dianthraquinone-azine compound which comprises heating a water suspension of the leuco derivative of said azine compound in the presence of an oxygen-containing gas at a temperature of about 100° C. until the leuco derivative is oxidized.

2. The process of producing N-dihydro-dianthraquinone-azine which comprises heating a water suspension of the leuco derivative of said azine in the presence of air at a temperature of about 100° C. until the leuco derivative is oxidized.

3. The process which comprises adding ten parts of leuco N-dihydro-dianthraquinone-azine in the form of a paste to from 60 to 80 parts of water which has a temperature of about 90° C., and boiling the resulting suspension in the presence of air until the leuco compound is oxidized.

4. A vat dyestuff comprising N-dihydro-dianthraquinone-azine of a purity obtainable by boiling a water suspension of the leuco derivative of said azine in the presence of air until said leuco derivative has changed completely into the long, very fine, hair-like crystals of the oxidized color, said N-dihydro-dianthraquinone-azine, when used as a pigment giving shades that are greener and brighter than those obtained from the azine produced by the ordinary oxidation of the leuco derivative in caustic soda solution, and said new product dyeing textile fibres from a hydrosulfite vat, in shades that are redder and brighter and more resistant to bleaching agents than N-dihydro-dianthraquinone-azine obtained by oxidation of said leuco derivative in the ordinary caustic soda solution.

5. A vat dyestuff comprising N-dihydro-dianthraquinone-azine in the form of very fine hair-like crystals, which can be broken by agitation into very short lengths thereby rendering the product of great value as a pigment, said crystals having an approximate length on the order of 1/100 of an inch, and the thickness of the crystals being on the order of about 1/100 to 1/1000 of the length.

6. A vat dyestuff comprising N-dihydro-dianthraquinone-azine in the form of fragments of microscopic hair-like crystals, having great value as a pigment, said crystals having an approximate length on the order of 1/100 of an inch, and the thickness of the crystals being on the order of about 1/100 to 1/1000 of the length.

In testimony whereof I affix my signature.

JOHN H. SACHS.